United States Patent
Peters et al.

(10) Patent No.: US 11,922,634 B2
(45) Date of Patent: Mar. 5, 2024

(54) ESTABLISHING A CONTOUR OF A STRUCTURE BASED ON IMAGE INFORMATION

(71) Applicant: KONINKLIJKE PHILIPS N.V., Eindhoven (NL)

(72) Inventors: Jochen Peters, Hamburg (DE); Olivier Ecabert, Aachen (DE); Carsten Meyer, Hamburg (DE); Reinhard Kneser, Aachen (DE); Juergen Weese, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/665,735

(22) Filed: Aug. 9, 2017

(65) Prior Publication Data
US 2017/0330328 A1 Nov. 16, 2017

Related U.S. Application Data

(63) Continuation of application No. 13/377,401, filed as application No. PCT/IB2010/052756 on Jun. 18, 2010, now abandoned.

(30) Foreign Application Priority Data
Jun. 24, 2009 (EP) .................................... 09163572

(51) Int. Cl.
*G06T 7/149* (2017.01)
*G06T 7/00* (2017.01)
(Continued)

(52) U.S. Cl.
CPC ............ *G06T 7/149* (2017.01); *G06T 7/0012* (2013.01); *G06T 7/12* (2017.01); *G06T 7/60* (2013.01);
(Continued)

(58) Field of Classification Search
CPC ..................................................... G06T 7/149
See application file for complete search history.

(56) References Cited

U.S. PATENT DOCUMENTS

| 5,633,951 A | * | 5/1997 | Moshfeghi | ........... | H04N 19/537 |
| | | | | | 375/E7.251 |
| 6,106,466 A | * | 8/2000 | Sheehan | ................ | A61B 5/062 |
| | | | | | 600/443 |

(Continued)

OTHER PUBLICATIONS

What a Pet Scan is and How They Work, https://www.whatnext.com/blog/posts/what-a-pet-scan-is-and-how-they-work (Year: 2018).*

(Continued)

*Primary Examiner* — Gandhi Thirugnanam

(57) ABSTRACT

A system for establishing a contour of a structure is disclosed. An initialization subsystem (1) is used for initializing an adaptive mesh representing an approximate contour of the structure, the structure being represented at least partly by a first image, and the structure being represented at least partly by a second image. A deforming subsystem (2) is used for deforming the adaptive mesh, based on feature information of the first image and feature information of the second image. The deforming subsystem comprises a force-establishing subsystem (3) for establishing a force acting on at least part of the adaptive mesh, in dependence on the feature information of the first image and the feature information of the second image. A transform-establishing subsystem (4) is used for establishing a coordinate transform reflecting a registration mismatch between the first image, the second image, and the adaptive mesh.

10 Claims, 2 Drawing Sheets

(51) Int. Cl.
  *G06T 7/12* (2017.01)
  *G06T 7/60* (2017.01)
(52) U.S. Cl.
  CPC ...... *G06T 7/97* (2017.01); *G06T 2207/10072* (2013.01); *G06T 2207/20116* (2013.01); *G06T 2207/30004* (2013.01)

(56) References Cited

U.S. PATENT DOCUMENTS

| | | | | |
|---|---|---|---|---|
| 6,295,464 | B1* | 9/2001 | Metaxas | G06T 17/20 600/407 |
| 6,362,821 | B1* | 3/2002 | Gibson | G06T 17/20 345/441 |
| 6,483,506 | B1* | 11/2002 | Costabel | G06T 17/20 345/646 |
| 7,010,164 | B2* | 3/2006 | Weese | G06T 7/12 382/199 |
| 7,167,172 | B2* | 1/2007 | Kaus | G06T 7/149 382/128 |
| 7,397,934 | B2* | 7/2008 | Bloch | G06T 7/33 382/128 |
| 7,796,790 | B2* | 9/2010 | McNutt | G06V 10/26 382/199 |
| 8,050,469 | B2* | 11/2011 | Kaus | G06T 7/60 382/128 |
| 2003/0036083 | A1* | 2/2003 | Tamez-Pena | G06T 7/0016 435/7.1 |
| 2003/0216631 | A1* | 11/2003 | Bloch | G06T 7/33 600/407 |
| 2004/0039259 | A1* | 2/2004 | Krause | G06T 15/20 600/300 |
| 2004/0066955 | A1* | 4/2004 | Tamez-Pena | A61B 5/418 382/128 |
| 2004/0147830 | A1* | 7/2004 | Parker | A61B 6/463 600/407 |
| 2005/0057562 | A1* | 3/2005 | Cowan | G06T 7/149 345/419 |
| 2005/0078858 | A1* | 4/2005 | Yao | G06T 7/0012 382/128 |
| 2005/0237328 | A1* | 10/2005 | Guhring | G06T 7/30 345/520 |
| 2006/0126922 | A1* | 6/2006 | Von Berg | G06T 7/0012 382/128 |
| 2006/0159341 | A1* | 7/2006 | Pekar | G06T 7/149 382/128 |
| 2007/0036402 | A1* | 2/2007 | Cahill | G06T 7/0012 382/128 |
| 2007/0036411 | A1* | 2/2007 | Guetat | G06T 7/149 382/128 |
| 2007/0127798 | A1* | 6/2007 | Chakraborty | G06F 16/94 382/128 |
| 2007/0297561 | A1* | 12/2007 | Breeuwer | G06T 7/12 382/169 |
| 2008/0085042 | A1* | 4/2008 | Trofimov | A61B 5/283 600/407 |
| 2008/0123927 | A1* | 5/2008 | Miga | A61B 90/36 382/131 |
| 2008/0205719 | A1* | 8/2008 | Pekar | G06T 3/0081 382/128 |
| 2008/0260230 | A1* | 10/2008 | Gotardo | G06V 10/755 382/131 |
| 2008/0262814 | A1* | 10/2008 | Zheng | G16H 30/20 703/11 |
| 2008/0279429 | A1* | 11/2008 | Fradkin | G06T 7/149 382/128 |
| 2009/0136099 | A1* | 5/2009 | Boyden | G06T 3/0075 382/128 |
| 2009/0226060 | A1* | 9/2009 | Gering | G06T 7/174 382/128 |
| 2009/0310835 | A1* | 12/2009 | Kaus | G06T 17/20 382/128 |
| 2010/0027861 | A1* | 2/2010 | Shekhar | G06V 10/755 382/128 |
| 2010/0067760 | A1* | 3/2010 | Zhang | G06T 7/143 382/130 |
| 2010/0135544 | A1* | 6/2010 | Mattiuzzi | G06T 7/35 382/128 |
| 2010/0145661 | A1* | 6/2010 | Ecabert | G06T 7/149 703/1 |
| 2010/0232645 | A1* | 9/2010 | Blaffert | G06T 7/75 382/103 |
| 2010/0232686 | A1* | 9/2010 | Dewan | G06K 9/6219 382/173 |
| 2011/0038516 | A1* | 2/2011 | Koehler | G06T 7/149 382/128 |
| 2012/0082354 | A1* | 4/2012 | Peters | G06T 7/149 382/199 |
| 2013/0195323 | A1* | 8/2013 | Liu | G06T 7/12 382/128 |
| 2017/0330328 | A1* | 11/2017 | Peters | G06T 7/97 |

OTHER PUBLICATIONS

Spect, https://medicine.utah.edu/radiology/radiology-research/learn/spect.php (Year: 2020).*
Oscar Camara, Olivier Colliot, Gaspar Delso, Isabelle Bloch. 3D nonlinear PET-CT image registration algorithm with constrained Free-Form Deformations. 3rd IASTED International Conference on Visualization, Imaging, and Image Processing (VIIP 2003), 2003, Benalmadena, Spain. (Year: 2003).*
Lobos et al., C. Lobos, Y. Payan, N. Hitschfeld, Techniques for the generation of 3D finite element meshes of human organs, 2010 Informatics in Oral Medicine: Advanced Techniques in Clinical and Diagnostic Technologies, Medical Information Science, pp. 126-158 (Year: 2010).*
Wells, W.M. et al. "Multi-Modal Volume Registration by Maximization of Mutual Information", by William M. Wells III et al, in Med Image Anal. Mar. 1996, 1(1):pp. 35-51.
Maurer, C.R. et al. "A review of medical image registration". Interactive Imageguided Neurosurgery Conference, 1993, pp. 17-44.
Pohl, K.M. et al. "A Unifying Approach to Registration, Segmentation, and Intensity Correction", vol. 3749/2005 Book Medical Image Computing and Computer-Assisted Intervention MICCAI 2005.
Nikou, C. et al., "A Probabilistic multiobject deformable model for MR/SPECT brain image registration and segmentation", Medical Imaging 1999, vol. 3661, pp. 1-12.
Meyer et al., "A multi-modality segmentation framework: Application to fully automatic heart segmentation", Proc. of SPIE, vol. 7259, Mar. 27, 2009, pp. 1-12.
Sermesant, M. et al., "Deformable biomechanical models: Application to 4D cardiac image analysis", Medical Image Analysis, vol. 7, No. 4, Dec. 1, 2003, pp. 475-488.
McInerney, T. et al., "Deformable models in medical image analysis: A survey", Medical Image Analysis, vol. 1, No. 2, 1996, pp. 91-108.
El Naqa, I. et al., "Concurrent multimodality image segmentation by active contours for radiotherapy treatment planning", Medical Physics, vol. 34, No. 12, Nov. 20, 2007, pp. 4738-4749.
Nastar, C. et al., "Frequency-based nonrigid motion analysis: Application to four dimensional medical images," IEEE Transactions on Pattern Analysis and Machine Intelligence, 1996 1101 IEEE Computer Society, USA, vol. 18, Nr: 11, pp. 1067-1079.
Nastar, C. et al., "Frequency-based nonrigid motion analysis: application to four dimensional medical images". IEEE Transactions on Pattern Analysis and Machine Intelligence vol. 18, No. 11, Nov. 1996, pp. 1067-1079.

* cited by examiner

ESTABLISHING A CONTOUR OF A STRUCTURE BASED ON IMAGE INFORMATION

This application is a continuation of U.S. application Ser. No. 13/377,401 filed on Dec. 9, 2011, which is a 35 U.S.C. § 371 of PCT/IB2010/052756 filed on Jun. 18, 2010, which claims the benefit of EP 09163572.2 filed on Jun. 24, 2009.

FIELD OF THE INVENTION

The invention relates to image segmentation and image registration. The invention further relates to establishing a contour of a structure.

BACKGROUND OF THE INVENTION

Image segmentation generally concerns selection and/or separation of a selected part of a dataset. Such a dataset notably represents image information of an imaged object and the selected part relates to a specific part of the image. The dataset is in general a multi-dimensional dataset that assigns data values to positions in a multi-dimensional geometrical space. For example, such datasets can be two-dimensional or three-dimensional images where the data values are pixel values, such as brightness values, grey values or color values, assigned to positions in a two-dimensional plane or a three-dimensional volume.

U.S. Pat. No. 7,010,164 discloses a method of segmenting a selected region from a multi-dimensional dataset. The method comprises the steps of setting up a shape model representing the general outline of a selected region and setting up an adaptive mesh. The adaptive mesh represents an approximate contour of the selected region. The adaptive mesh is initialized on the basis of the shape model. Furthermore, the adaptive mesh is deformed in dependence on the shape model and on feature information of the selected region. In this way, a more precise contour of the selected region is obtained.

SUMMARY OF THE INVENTION

It would be advantageous to have an improved system for establishing a contour of a structure. To better address this concern, in a first aspect of the invention a system is presented that comprises
  an initialization subsystem for initializing an adaptive mesh representing an approximate contour of the structure, the structure being represented at least partly by a first image, and the structure being represented at least partly by a second image;
  a deforming subsystem for deforming the adaptive mesh, based on feature information of the first image and feature information of the second image.

Since the adaptive mesh is deformed based on both feature information of the first image and feature information of the second image, any information about the structure which is missing or unreliable in the first image may be obtained from the feature information of the second image. This way, the feature information of both images complement each other. The result may be a deformed adaptive mesh reflecting the shape information represented by both images. The contour may describe an outline of the structure. The structure may be, for example, a body, an organ, or a mass. The contour may describe a surface in a three-dimensional space. Alternatively, the contour may describe a line or curve in a two-dimensional space.

The deforming subsystem may be arranged for deforming the adaptive mesh, based on feature information of a plurality of images. In particular, an adaptive mesh may be deformed based on feature information of more than two images.

The deforming subsystem may comprise a force-establishing subsystem for establishing a force acting on at least part of the adaptive mesh in dependence on the feature information of the first image and the feature information of the second image. By considering the feature information of the first image and the feature information of the second image in establishing the force acting on a part of the adaptive mesh, the force may be more reliable. Moreover, the resulting deformed mesh is based on information from the two images. This may make the resulting deformed mesh more accurate. The feature information of the images may be weighted based on reliability criteria, for example, such that feature information which is regarded to be reliable determines the force to a greater extent than feature information which is regarded to be less reliable.

The force-establishing subsystem may be arranged for establishing the force acting on at least part of the adaptive mesh also in dependence on a type of the first image and/or a type of the second image. The type of an image may comprise an imaging modality or a clinical application of the image or, for example, a body part which is imaged. Different ways of establishing the force may be used for these different types of images, which allows the adaptive mesh to be adapted based on a plurality of images of different types.

The deforming subsystem may comprise a feature information-extracting subsystem for extracting feature information from the respective images, using respective models trained for the particular imaging modalities or protocols used to acquire the respective images. This helps to deform the mesh in an appropriate manner. Moreover, the feature information may be used by the force-establishing subsystem to establish the forces.

The system may comprise a transform-establishing subsystem for establishing a coordinate transform defining a registration between the first image, the second image, and/or the adaptive mesh, based on feature information in the respective image and the adaptive mesh. By involving the adaptive mesh in the generation of the coordinate transform, a more accurate registration may be obtained. The more accurate registration may in turn improve the adaptive mesh resulting from the deforming subsystem.

The coordinate transform may define a relation between a coordinate system of the first image and a coordinate system of the second image. Such a coordinate transform may be used to define a registration between the two images.

The coordinate transform may be an affine transform. Such an affine transform may represent global differences, such as movement, rotation, and/or enlargement. Such global changes then do not need to hinder the model adaptation.

The system may comprise a general outline-providing subsystem for providing a shape model representing a general outline of the structure. Moreover, the deforming subsystem may be arranged for deforming the adaptive mesh, based also on the shape model. For example, the adaptive mesh is deformed on the basis of an internal energy and the internal energy is defined in dependence on the shape model. This may help to avoid, for example, that image features in the multi-dimensional dataset would drive the adaptive mesh to false boundaries, so-called false attractors.

The first image and the second image may have been acquired using, for example, the same or two different imaging modalities from the group of X-ray, 3D rotational X-ray, CT, MR, Ultrasound, PET and SPECT, magnetic particle imaging. For example, the system may comprise an imaging modality of that group to perform the image acquisitions. Alternatively or additionally, an input may be provided for retrieving the image data from elsewhere.

The first and second image may be acquired using two different imaging modalities. The different features which appear in the images of different imaging modalities may be combined or may complement each other in the model adaptation.

The first image may have been acquired while an imaged subject contained a structure it did not contain during the acquisition of the second image. For example, the subject contained injected contrast agent during the acquisition of the first image, but not during the acquisition of the second image. The order in which images are acquired is not of importance here.

The first image and the second image may relate to a same patient. The different features visible in the first image and second image then may be assumed to relate to the same body structure.

A medical imaging workstation may comprise the system set forth.

A medical imaging acquisition apparatus may comprise a scanner for acquiring the first image and the system set forth.

A method of establishing a contour of a structure may comprise
  initializing an adaptive mesh representing an approximate contour of the structure, the structure being represented at least partly by a first image, and the structure being represented at least partly by a second image; and
  deforming the adaptive mesh, based on feature information of the first image and feature information of the second image.

A computer program product may comprise instructions for causing a processor system to perform the steps of the method set forth.

It will be appreciated by those skilled in the art that two or more of the above-mentioned embodiments, implementations, and/or aspects of the invention may be combined in any way deemed useful.

Modifications and variations of the image acquisition apparatus, of the workstation, of the system, and/or of the computer program product, which correspond to the described modifications and variations of the system, can be carried out by a person skilled in the art on the basis of the present description.

A person skilled in the art will appreciate that the method may be applied to multidimensional image data, e.g., to 2-dimensional (2-D), 3-dimensional (3-D) or 4-dimensional (4-D, for example 3-D+time) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be further elucidated and described with reference to the drawing, in which.

DETAILED DESCRIPTION OF EMBODIMENTS

Segmentation of medical images (2D, 3D, 4D) from one imaging modality can be performed automatically using shape-constrained deformable models. Depending on the task and the imaging protocol, some structures of interest may be invisible or hard to define. If no protocol is available that provides all the needed information, then a multi-modal approach may be helpful in solving the segmentation task. Here, complementary information about all structures of interest may provide a comprehensive segmentation.

Prior knowledge of inter-image registration parameters may be available to the system a priori. In such a case, the relation between the coordinate systems of the different images is known beforehand. For each available image, image-based forces may be established that jointly "pull" at least part of a common mesh model towards the structure of interest. Simultaneous image segmentation and registration is also possible. For example, the relations between the image coordinate systems and the mesh coordinate system are refined iteratively in alternation with the segmentation.

For improved viewing, regions with visible anatomical structures can be identified in images obtained from the different imaging modalities and combined in a single composite image. For example, the "locally most informative" image patches (i.e., image parts from that modality that provides the most convincing boundary information at an image location) may be fused to obtain one overall display showing image information from various sources. A user interface may be arranged for enabling the user to switch (locally, e.g., per displayed patch) between the complementary images to check or compare the information provided by each imaging modality. For example, information from both images may be encoded into a model comprising the contour or adaptive mesh, and the combined model may be displayed. For example, calcifications may be extracted from an image without contrast agent, whereas wall thickness may be extracted from another image with contrast agent.

If the inter-image registration parameters are not available a priori, or if it is desired to further improve these parameters, a registration process may be performed. Such registration process may comprise matching the images onto each other by means of rigid, affine, or even non-linear coordinate transforms. This may be done by optimizing a global match function between the images being registered. Match functions may establish some sort of correlation (or an objective function) between the grey values (image intensities) of the images. An optimal match may be achieved by maximizing this correlation or objective function. Alternatively (or thereafter), "forces" may be defined which may direct the first and/or the second image to a common mesh based on image features. Such a method arranged for aligning the images with the common mesh will be described in more detail further below.

Figure 1:
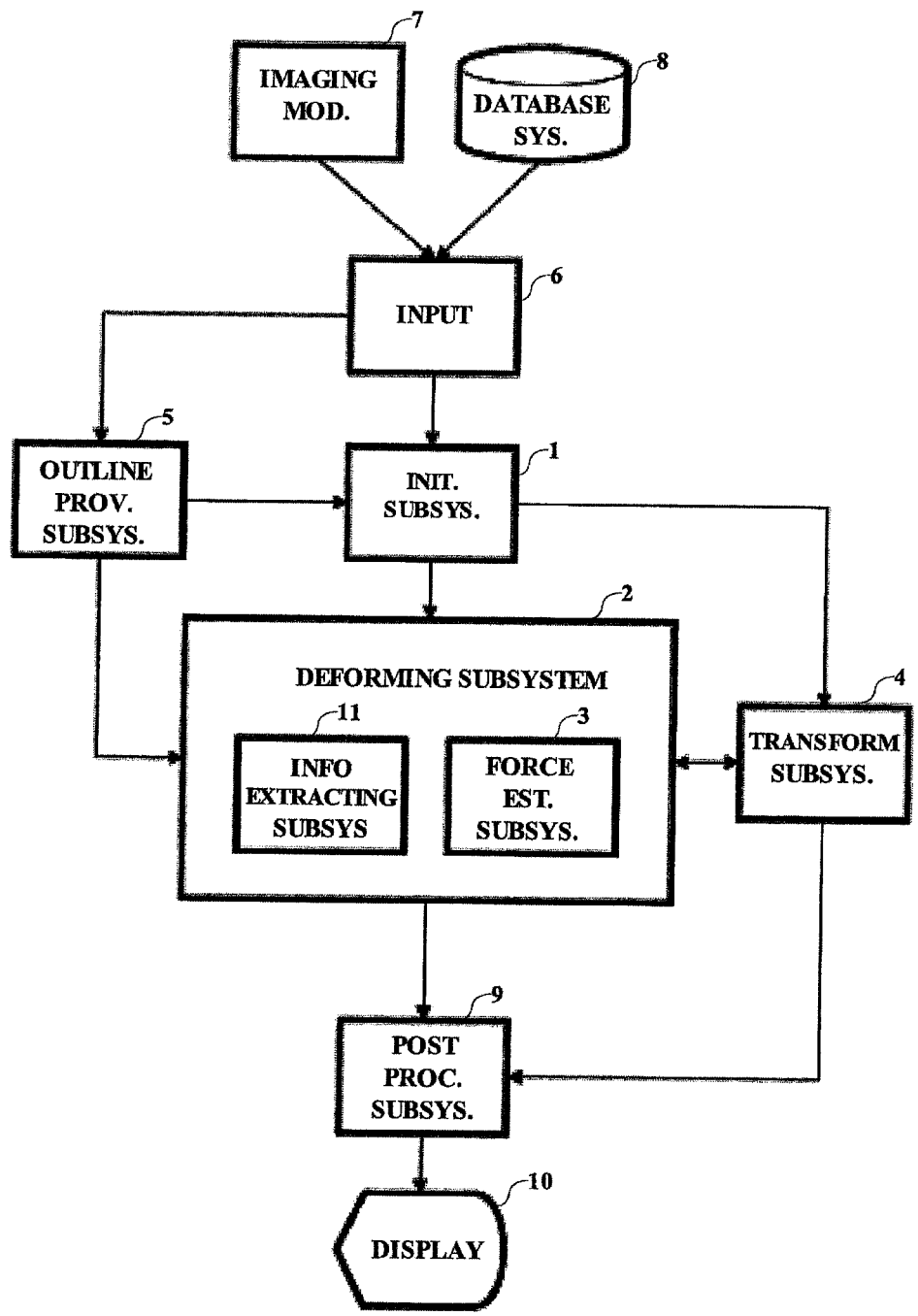
FIG. 1 shows a block diagram of a system for establishing a contour of a structure.

FIG. 1 illustrates a system for establishing a contour of a structure. Such a system may be implemented in hardware or software or a combination thereof. The system may comprise an input 6 for retrieving image data from an imaging modality 7, for example, or from a database system 8. Such a database system 8 may comprise a PACS server, for example. An image may comprise a multi-dimensional array of grey-values, for example. The grey-values represent objects scanned using an imaging modality, such as computed tomography (CT), or magnetic resonance (MR) imaging.

An initialization subsystem 1 is arranged for initializing an adaptive mesh. The adaptive mesh represents an approximate contour of a structure. Such a structure could be an organ of a human body, for example. Other possible examples include an organ of an animal, or a non-organic object in non-destructive testing. The structure may be represented at least partly by a first image obtained via the input 6. In addition, the structure may be represented at least partly by a second image obtained via the input 6. The initialization subsystem may be arranged for using a default shape with which the adaptive mesh may be initialized. Alternatively, information in the first and second images may be used, for example by identifying a region having a different grey scale than the remainder of the image. The adaptive mesh may then be initialized as a contour of said region. The adaptive mesh may be initialized based on a shape model provided by the general outline-providing subsystem 5. For example, the adaptive mesh is initialized to be equal to a shape model provided by the general outline-providing subsystem 5. The initialization subsystem may further be arranged for initializing the adaptive mesh with a previous deformed model. For example, deformation may occur in iterations.

The deformation of the adaptive mesh may be performed by a deforming subsystem 2. The deformation may be based on feature information of the first image and feature information of the second image. This way, two information sources are used to obtain feature information. Feature information may include, for example, gradients. Other kinds of feature information are known in the art per se.

The deforming subsystem may comprise a force-establishing subsystem 3 for establishing a force acting on at least part of the adaptive mesh in dependence on the feature information of the first image and the feature information of the second image. For example, the first image may comprise a first feature close to a part of the adaptive mesh. However, the second image may also comprise a second feature close to that part of the adaptive mesh. The force-establishing subsystem 3 may take both features into account when establishing the force value. When only one of the images comprises a relevant feature close to a part of the adaptive mesh, the force acting on that part of the adaptive mesh may be established based on only this feature. The deforming subsystem 3 may comprise a feature information-extracting subsystem 11 for extracting feature information from the respective images, using respective models trained for the particular imaging modalities or protocols used to acquire the respective images. This way, the particular feature information provided by each modality can be exploited.

The system may further comprise a transform-establishing subsystem 4 for establishing a coordinate transform defining a registration between the first image, the second image, and the adaptive mesh. This registration may be based on the adaptive mesh and the feature information in one or more of the images. Points of the adaptive mesh may be mapped onto points in the first or second image. A coordinate transform may be established which defines a relation between a coordinate system of the first image and a coordinate system of the second image. For example, the adaptive mesh may be defined with respect to the coordinate system of one of the images, and a coordinate transform may be established mapping the points of the mesh and of the image onto points of another image. To this end, feature information of that other image may be used and compared with the shape of the adaptive mesh. It is also possible to establish coordinate transforms from the adaptive mesh to different images; the transform from one image to the other can be derived from the transforms mapping the adaptive mesh to each of the images.

The registration may be based on the adaptive mesh and the feature information in one or more of the images. For example, a registration of a mesh to an image is computed. After that, the transform representing the registration may be inverted and used to register the two images. To start, for a given image, a mesh of fixed shape may be registered to the image via a parametric transformation (for example, but not limited to, an affine transformation). This registration may be controlled by "forces" established between mesh points (or triangles) and corresponding image points (also called target points or target surfaces) which may lead to a so-called external energy. For example, such an external energy may be computed as a sum of energies of imaginary springs attached between the mesh points and the target structures. By minimizing the external energy with respect to the parametric transform, the mesh may be aligned, or registered, with the image. To register two images, the transform may be inverted, if necessary. Instead of transforming the mesh to either image, an inverse transform may be used to align each image with the mesh. This is a way of establishing registration parameters between the two images.

The coordinate transform-establishing subsystem 4 may be arranged for establishing an affine transform. This way, only global changes are represented in the coordinate transform. More detailed changes may be accounted for by the deforming subsystem 2 and/or by the force-establishing subsystem 3.

The system may comprise a general outline-providing subsystem 5 for providing a shape model representing a general outline of the structure. For example, the subsystem 5 may comprise or have access to a database of shape models, e.g. via the input 6. These shape models may, for example, provide an average shape for a particular type of object or structure. For example, different models may be provided for the lungs and for the kidney. A user input or image metadata may be used to select one of the shape models from the database. The deforming subsystem 2 may be arranged for deforming the adaptive mesh, based also on the shape model. This way, the general shape of the structure which is segmented may be used as a reference during the deformation process. The shape model may also be used by the transform-establishing subsystem 4. The general outline-providing subsystem 5 may further provide access to multi-modal image feature information. For example, a database may be provided specifying which image features should be considered in relation to images from a particular imaging modality and/or images of a particular body part or application.

The first image and the second image may be acquired using one or more imaging modalities, for example from the group of CT, MR, Ultrasound, PET and SPECT. However, these modalities are not to be construed in a limiting sense. Different imaging modalities may result in different feature information. The feature information obtainable by different imaging modalities may be complementary. For example, CT and MR show different kinds of tissues. Multiple images using the same modality may also provide additional, complementary feature information compared to only one image. For example, the images may relate to different (preferably overlapping) portions of the subject. Moreover, different images may be acquired after applying or not applying different sorts of contrast agents or after waiting for different times to observe the dynamics of contrast distribution in the tissue over time.

The first image and the second image may relate to a same subject, for example a patient. The first image may be acquired while an imaged subject contains a structure it does not contain during the acquisition of the second image. For example, contrast agent inflow can be visualized in the images. Also, a sequence of images showing a moving object may be captured; these images may be used in the system described herein.

The adaptive mesh, after successful deformation, and the coordinate transformation(s), may be forwarded to a post-processing subsystem 9 for further processing. For example, the data may be stored in a database such as a patient database. It is also possible to use the results to identify the grey values of the images relating to the structure. This way, computations and comparisons become possible. The post-processing subsystem 9 may also be arranged for generating a visualization of the contour, for example as an overlay over one or more of the images. This visualization may be shown to a user on a display 10.

A medical imaging workstation may comprise the system set forth. A medical imaging workstation may further comprise user interface means, including for example the display 10, a keyboard and/or pointing device such as a mouse, and a network connection or other communications means. The communication means may be used to retrieve image information via input 6 and/or to store the results such as the deformed mesh or the coordinate transform, or data derived therefrom.

A medical imaging acquisition apparatus may comprise a scanner for acquiring the first image and/or the second image, and the system set forth. For example, the medical imaging apparatus may comprise the features of the medical imaging workstation.

Figure 2:
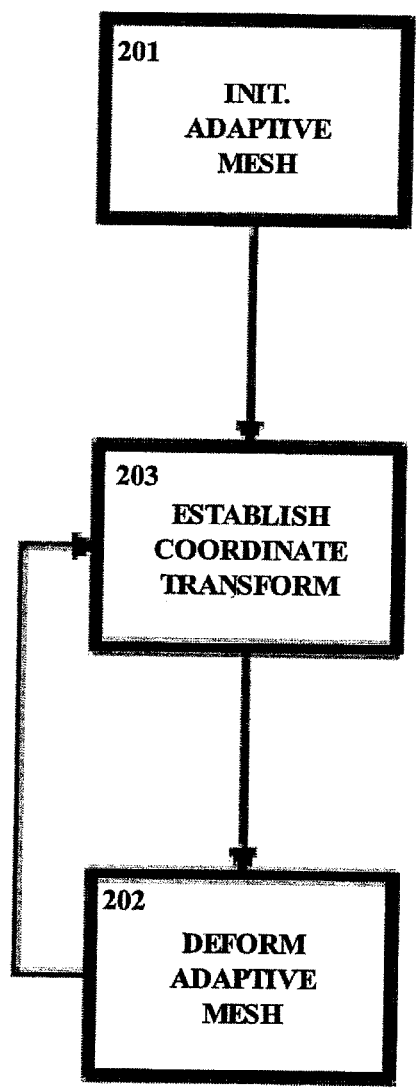
FIG. 2 shows a block diagram of a method of establishing a contour of a structure.

FIG. 2 illustrates aspects of a method of establishing a contour of a structure. In step 201, the adaptive mesh is initialized. The adaptive mesh represents an approximate contour of the structure, the structure being represented at least partly by a first image, and the structure being represented at least partly by a second image. In step 202, the adaptive mesh is deformed based on feature information of the first image and feature information of the second image. The deforming step 202 may be iterated until the adaptive mesh has converged. In step 203, a coordinate transform is established. The coordinate transform may define a registration between the first image, the second image, and the adaptive mesh. The coordinate transform may be based on feature information in the respective image or images and the adaptive mesh. The coordinate transform may be used to register the images or to register the mesh to one or more of the images. The order of the steps may be interchanged, for example, step 203 may precede step 202. Also, either of steps 202 or 203 may be omitted. Moreover, steps 202 and 203 may be performed iteratively, by performing steps 202 and 203 in alternating fashion. This way, the registration may benefit from the updated mesh and the mesh deformation may benefit from the updated coordinate transform. The method may be implemented as a computer program product.

Multi-modal segmentation may be used for segmenting images with missing information by inclusion of information provided by other images. A model-based approach for image segmentation may be used for identifying most or all visible structures of an image. However, most model-based approaches are optimized for a particular imaging modality. By combining model-based approaches that have been optimized for different imaging modalities, the system may be enabled to identify most or all visible structures in each single image. By combining the available information about the visible structures from the images (preferably obtained from different imaging modalities), the different images complement each other. This will improve the segmentation compared to a segmentation of an individual image. Furthermore, any found correspondences between identified anatomical landmarks in different images can be pointed out in a suitable user interface.

It is possible to combine registration and segmentation. This may be done by refining an initial rough guess of the registration parameters based on a comparison of the detected visible structures (anatomical landmarks) in the images. Registration may thus be preferably driven by geometric information (describing the location of visible structures). However, it is also possible to drive the registration by a global matching of grey values. Using a model of the desired anatomy in combination with geometric information may improve the registration accuracy, because it takes into account the anatomical structures of interest instead of the whole image. Also, an initial registration may be obtained from prior knowledge about the relations between the scanner geometries with respect to the patient.

A multi-modal segmentation framework may comprise establishing image-based forces that "pull" on an adaptive mesh describing the structures of interest. The mesh may be defined with respect to a coordinate system. This coordinate system may be related to image coordinate systems via an affine transformation. Such affine transformations may establish a registration between the images and the common segmentation result.

The multi-modal segmentation may combine the image-based forces derived from all available images of a particular structure of interest. These image-based forces may be based on visible structures in the images. The image-based forces may "pull" the common mesh to a compromise position. If a particular region in an image does not contain structures of interest, these regions preferably do not contribute to the image-based forces. However, if a structure of interest is available in a corresponding region of another image, this structure preferably does contribute to the image-based forces. This provides a way of "bridging the gap" caused by image regions which do not reveal the structure of interest.

For any given portion of the adaptive mesh model, it is possible to assess which image (or images) represent(s) the structure on which the portion of the surface model is based, for example by considering the forces which attracted the portion of the adaptive surface model. Based on this assessment, a combined image may be composed of portions of the different images as a "patchwork" of most relevant image regions. A user interface may show an indication of which image contributed to a given portion of the adaptive mesh model. Moreover, the user interface may enable a user to visualize a desired image in order to assess the complementary image information. Such visualization may be local; for example, if the composed image contains a first portion of a first image, the user may choose to replace said first portion by a corresponding portion of a second image, to obtain a new composite image which may be visualized.

Combining information from multiple images, which may have been acquired from different modalities, allows segmenting structures that are only partly visible in each of the images but well-defined if all images are taken into account.

Furthermore, by comparing the visible structures per image with the common segmentation result, an (affine) registration between the image coordinate systems may be estimated or refined.

In a multi-modal segmentation framework, different images $I_n$ may be acquired within separate coordinate systems. E.g., the patient may be placed in different scanners, or scan orientations may change. Offsets as well as re-orientations and maybe even scaling effects due to geometric distortions may need to be accounted for. However, this is not always the case. It is also possible to acquire multiple images in the same coordinate system.

To arrive at a common segmentation, first, a reference coordinate system may be established, wherein the segmentation result may be represented. This will be called the common coordinate system (CCS) hereinafter. An image $I_n$ may have its own image coordinate system which may be denoted by "$ICS_n$". It is also possible that all images have the same coordinate system. In such a case, ICS, is the same for each image n.

In some cases, the transform between the coordinate systems may be known. Furthermore, a global linear transform may sometimes be sufficient to map the CCS to any $ICS_n$. Let x be some coordinate vector in the CCS, and let x be the corresponding vector in $ICS_n$. Then, some transform $T_n = \{M_n, t_n\}$ with a 3×3 matrix $M_n$ and a translation vector $t_n$ maps x to x':

$$x' = M_n \cdot x + t_n \quad (1)$$

Gradients ∇I, as examples of feature information, may also change under the transform. Gradients may be transformed as follows (∇I'=gradient in $ICS_n$, ∇I=gradient if $I_n$ were transformed into the CCS):

$$\nabla I'(x') = (M_n^{-1})^T \cdot \nabla I(x) \Leftrightarrow \nabla I(x) = M_n^T \cdot \nabla I(x) \quad (2)$$

where the notation $^T$ denotes matrix transposition. (Here, the point x' where the transformed gradient ∇I' is evaluated includes the transform in (1)).

The multi-modal segmentation may be realized as follows: The internal energy of the deforming shape model may be established in the CCS. External energies may be set up for individual ones of the images $I_n$ and accumulated with some weighting factors $\beta_n$ with $\Sigma \beta_n = 1$:

$$E_{tot} = \sum_n \beta_n \cdot E_{ext,n} + \alpha \cdot E_{int} \quad (3)$$

In combination, the common segmentation may produce a "best compromise" between the external forces from the $I_n$ and the internal forces from the shape model.

Example formulations of the external energies if coordinate systems differ by $T_n$ are described hereinafter. By applying the external energies and internal energies to the adaptive mesh, the adaptive mesh may be deformed to obtain a contour of a structure in the image or images. An example external energy $E_{ext}$ in some standard coordinate system may be written as (here $c_i$ represents the mesh point that is subject to optimization):

$$E_{ext} = \sum_i f_i \cdot \left( \frac{\nabla I(x_i^{target})}{\|\nabla I(x_i^{target})\|} \cdot (c_i - x_i^{target}) \right)^2 \quad (4)$$

To set up $E_{ext,n}$, in case of a transformed coordinate system, target points may be detected in the image $I_n$. This may be done by transforming the triangle centers $c_i$ and normals from the CCS to $ICS_n$ and by searching a target point around a transformed triangle center. Within $ICS_n$, a gradient direction $\nabla I'/\|\nabla I'\|$ may be determined at a detected target point.

A first option for $E_{ext,n}$ is to back-transform $x_i'^{target}$ into the CCS and to establish the external energy there. Thinking in "spring forces", the springs may be attached to the triangles in the CCS pulling the mesh towards back-transformed target planes. This involves the back-transformation of the gradient direction using (2) and re-normalization, for example:

$$E_{ext,n} = \sum_i f_i' \cdot \left( \frac{M_n^T \cdot \nabla I'(x_i'^{target})}{\|M_n^T \cdot \nabla I'(x_i'^{target})\|} \cdot (c_i - x_i^{target}) \right)^2 \quad (5)$$

where $x_i^{target}$ is a back-transformed target point and $c_i$ is a triangle center in the CCS. Another option is to formulate $E_{ext,n}$ within the image $I_n$, i.e., within the $ICS_n$.

The transformations between the image coordinate systems may be unknown. Finding these transformations may involve a registration task. This registration task may be solved in combination with the segmentation task.

Different aspects of the registration may be identified; these aspects may help to arrive at an initial coarse estimation of $M_n$ and $t_n$:

Gross orientation of the images, e.g., axial versus sagittal or coronal slices in the x-y plane (for MR images, oblique planes may also be acquired): This information is normally available from the scanner.

Scaling of the images: Normally, images should "live" in metric space with no or little distortions. We may use the gross orientation and a scaling factor of 1 as an initial guess for the transformation matrices $M_n$.

Translation: Images may have an unknown coordinate offset. However, object localization techniques may allow coarsely localizing the organ of interest.

The transforms may be refined per image $I_n$. For example, it is possible to take the current instance of the commonly adapted mesh and optimize the transformation $T_n$ such as to minimize the external energy for $I_n$ alone. $T_n$ then may describe an improved mapping of the common mesh to the respective image. After performing this step for all images, it is possible to continue with the multi-modal segmentation using the updated transforms $T_n$. This procedure of iterative multi-modal mesh adaptation and re-estimation of all $T_n$ may result in a converged segmentation including the registration parameters as encoded by $T_n$.

The segmentation and/or registration techniques described herein may be applied for example for segmentation of structures or complex organs that cannot be fully described by a single imaging modality alone. The techniques may further be applied for segmentation of structures represented by images that do not contain the full anatomical information. Complementary scans from different imaging modalities may provide any such missing information. For example, functional images, such as PET or SPECT images, may not provide full anatomical information. By performing the techniques presented herein on a functional image and an anatomical image, such as a CT image or MR image, an improved segmentation may be obtained. Moreover, the techniques may be used to register the functional image with the anatomical image. Moreover, the techniques may be used to generate a composite image showing both the functional and the anatomical information.

A method of establishing a contour of a structure may start with initializing a shape model. Next, the structure or parts of it may be identified in a first image at a first image location and in a second image at a second image location which may be different from the first image location. A first force value may be associated with a first portion of the initialized shape model, the first force value being based on the structure in the first image, the first portion of the initial shape model corresponding to the first image location. A second force value may be associated with a second portion of the initial shape model, the second force value being based on the structure in the second image, the second portion of the initial shape model corresponding to the second image location. The shape of the first portion of the initialized shape model may be adapted based on the first force value. The shape of the second portion of the initialized model may be adapted based on the second force value. If both portions of the initialized shape model overlap, they may be adapted based on both force values.

It will be appreciated that the invention also extends to computer programs, particularly computer programs on or in a carrier, adapted for putting the invention into practice. The program may be in the form of source code, object code, a code intermediate source and object code such as a partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or stored in one or more files that may be linked statically or dynamically. Another embodiment relating to a computer program product comprises computer executable instructions corresponding to each of the means of at least one of the systems and/or products set forth. These instructions may be subdivided into subroutines and/or stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means. When the program is embodied in such a signal, the carrier may be constituted by such a cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for establishing a contour of a structure comprising:
   one or more computer processors configured to:
      receive a first image from a first imaging modality, the first image at least partially representing the structure;
      receive a second image from a second imaging modality, the second imaging modality being different form the first imaging modality, the second image at least partially representing the structure, wherein the first and second images both depict common portions of the structure and the first image depicts a portion of the structure not depicted by the second image;
      performing a deforming step including:
         determining a first force value based exon features in the first image for a first part of a common adaptive mesh based on a corresponding portion of the structure that is represented in the first image;
         determining a second force value based on features in the second image for the first part of the common adaptive mesh;
         back-transforming one or more components of the first force value and one or more components of the second force value from respective image coordinate systems (ICSs) to a common coordinate system (CCS), the CCS corresponding to the common adaptive mesh and the ICSs corresponding to the first image and the second image respectively;
         determining an external net force based on the back-transformed first and second force values; and
         applying the external net force to the first part of the common adaptive mesh;
         wherein components of the back-transformation are determined by aspects of a concurrent iterative registration process; and
   a display configured to display the first and second images and the common adaptive mesh.

2. The system according to claim 1, wherein the components of the back-transformation include a transformation matrix and a translation vector for mapping a coordinate vector from one of the ICSs to the CCS.

3. The system according to claim 1, wherein the structure is an internal organ of an imaged patient and the adaptive mesh model of the internal organ, wherein applying the external net forces adapts the adaptive mesh to the contour of the organ of the imaged patient.

4. The system according to claim 3, wherein the one or more computer processors are further configured to iteratively:
adapt the common adaptive mesh with the net external forces and re-estimate the components of the back-transformation at each iteration of the concurrent iterative registration process.

5. A computer-implemented method for establishing a contour of a structure comprising:
receiving a first image from a first imaging modality, the first image at least partially representing the structure;
receiving a second image from a second imaging modality, the second imaging modality being different form the first imaging modality, the second image at least partially representing the structure, wherein the first and second images both depict common portions of the structure and the first image depicts a portion of the structure not depicted by the second image;
establishing the contour of the structure by:
determining a first force value based on features in the first image for a first part of a common adaptive mesh based on a corresponding portion of the structure that is represented in the first image;
determining a second force value based on features in the second image for the first part of the common adaptive mesh;
back-transforming one or more components of the first force value and one or more components of the second force value from respective image coordinate systems (ICSs) to a common coordinate system (CCS), the CCS corresponding to the common adaptive mesh and the ICSs corresponding to the first image and the second image respectively;
determining an external net force based on the back-transformed first and second force values; and
applying the external net force to the first part of the common adaptive mesh;
wherein components of the back-transformation are determined by aspects of a concurrent iterative registration process; and
with a display, displaying the first and second images and the common adaptive mesh with the common adaptive mesh displayed as an overlay on the first and second images.

6. The method according to claim 5, wherein the registration process includes:
mapping the common adaptive mesh onto points in the first image;
mapping the common adaptive mesh onto points in the second image;
estimating coordinate transforms between the common adaptive mesh and the first and second images, wherein the coordinate transforms are included among the components of the back-transformation; and
registering the first and second images with the estimated coordinate transforms.

7. The method according to claim 6, wherein the structure is an internal organ of an imaged patient and the adaptive mesh is initialized with a model of the internal organ, wherein applying the net external forces adapts the adaptive mesh model to the contour of the organ of the imaged patient.

8. The method according to claim 5, further including:
selecting a shape model from a database storing shape models of a plurality of organs, and
initializing the common adaptive mesh with the selected shape model.

9. The method according to claim 6, further including iteratively adapting the common adaptive mesh and re-estimating the components of the back-transformation at each iteration of the concurrent iterative registration process.

10. A non-transitory computer readable medium storing instructions that, when executed by one or more processors, cause the one or more processors to:
receive a first image from a first imaging modality, the first image at least partially representing the structure;
receive a second image from a second imaging modality, the second imaging modality being different form the first imaging modality, the second image at least partially representing the structure, wherein the first and second images both depict common portions of the structure and the first image depicts a portion of the structure not depicted by the second image;
establishing the contour of the structure by:
determining a first force value based on features in the first image for a first part of a common adaptive mesh based on a corresponding portion of the structure that is represented in the first image;
determining a second force value based on features in the second image for the first part of the common adaptive mesh;
back-transforming one or more components of the first force value and one or more components of the second force value from respective image coordinate systems (ICSs) to a common coordinate system (CCS), the CCS corresponding to the common adaptive mesh and the ICSs corresponding to the first image and the second image respectively;
determining an external net force based on the back-transformed first and second force values; and
applying the external net force to the first part of the common adaptive mesh;
wherein components of the back-transformation are determined by aspects of a concurrent iterative registration process; and
with a display, displaying the first and second images and the common adaptive mesh with the common adaptive mesh displayed as an overlay on the first and second images.

* * * * *